No. 627,365. Patented June 20, 1899.
A. W. THOMSON.
EDUCATIONAL APPLIANCE.
(Application filed Oct. 22, 1898.)
(No Model.) 2 Sheets—Sheet 2.
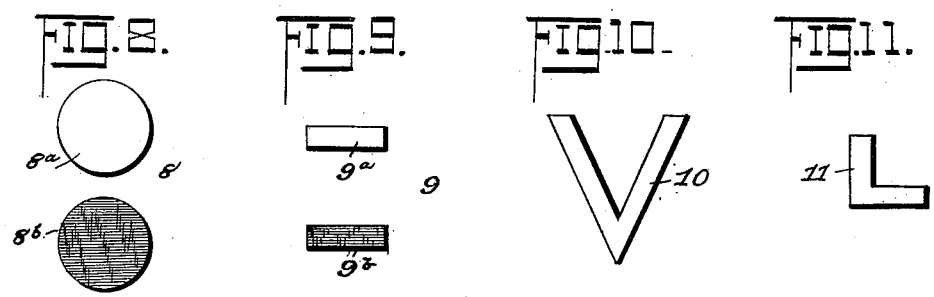
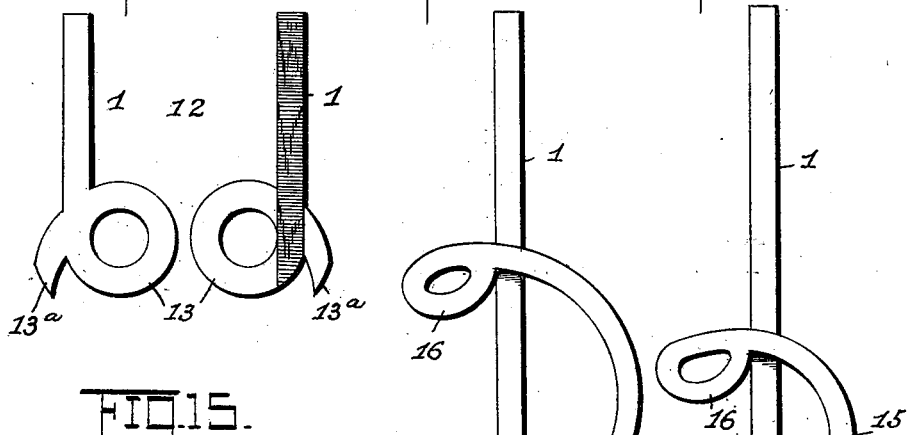
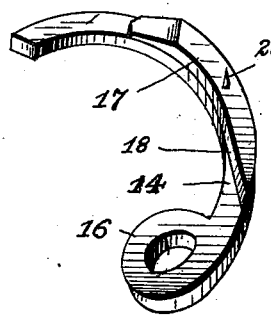
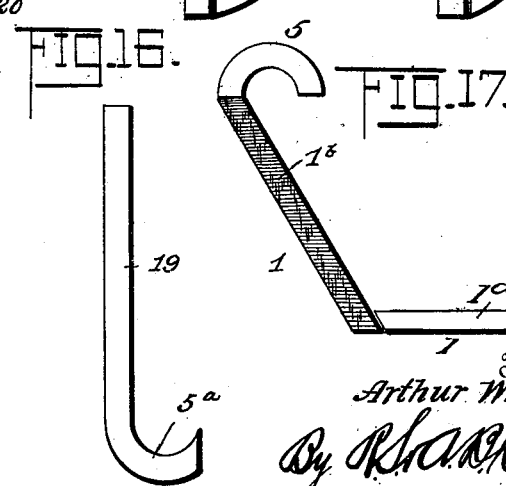
Witnesses:
Saml R Turner
C.C. Hines
Inventor:
Arthur W. Thomson,
By R.S. & A.B. Lacey,
Attorneys.

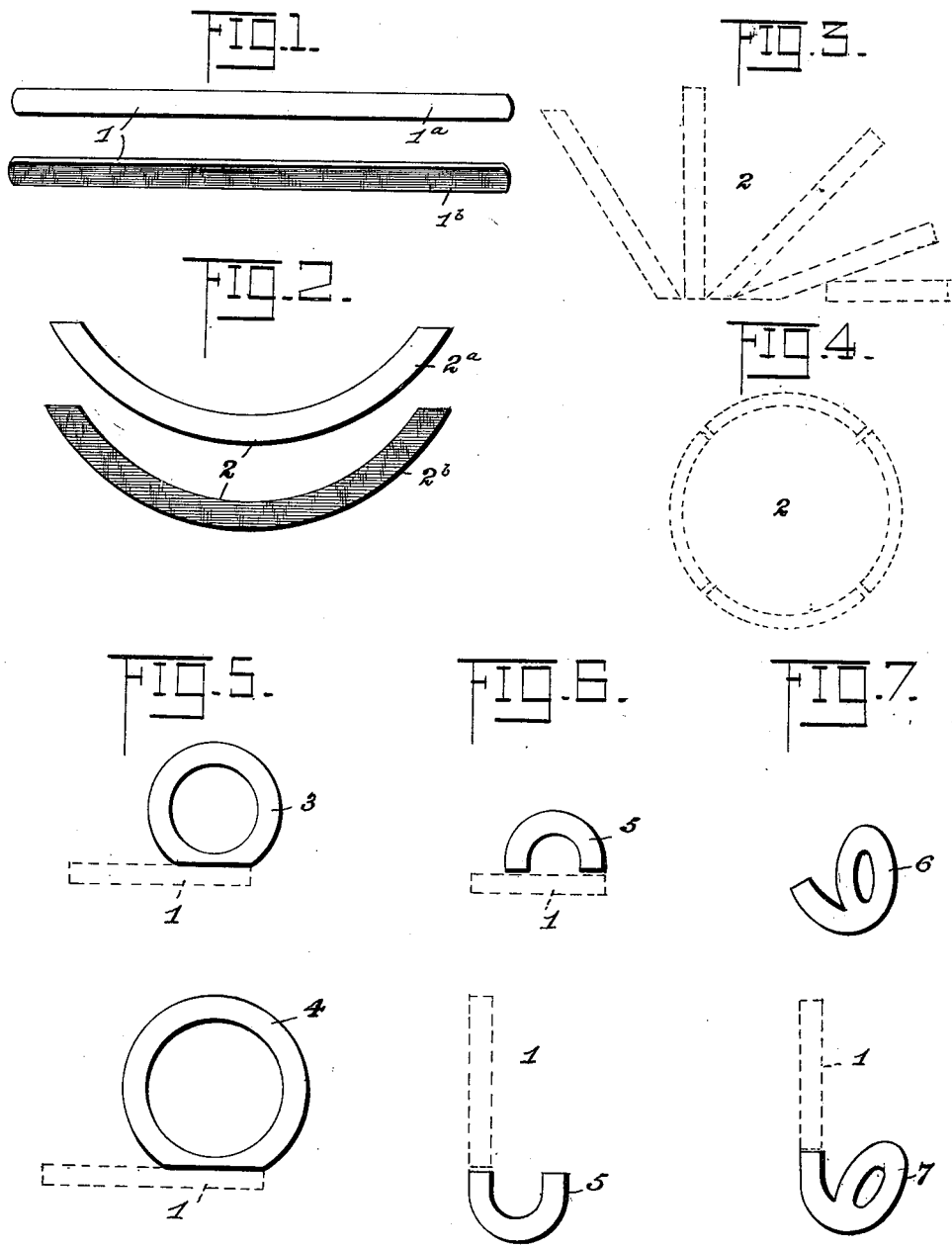

UNITED STATES PATENT OFFICE.

ARTHUR WM. THOMSON, OF NEW YORK, N. Y.

EDUCATIONAL APPLIANCE.

SPECIFICATION forming part of Letters Patent No. 627,365, dated June 20, 1899.

Application filed October 22, 1898. Serial No. 694,315. (No model.)

*To all whom it may concern:*

Be it known that I, ARTHUR WM. THOMSON, a subject of the Queen of Great Britain, residing at New York, in the county of New York and State of New York, have invented certain new and useful Improvements in Educational Appliances; and I do hereby declare the following to be a full, clear, and exact description of the invention, such as will enable others skilled in the art to which it appertains to make and use the same.

My invention relates to improvements in educational appliances, and particularly to means for facilitating and rendering easier the teaching and learning of the art of phonetic shorthand.

The primary object of my invention is to provide means whereby the kindergarten system of object-lessons may be utilized to simplify the mode of shorthand instruction and render the same of interest to the student; and to this end I employ a series of patterns or forms, which may be termed "phonoforms" or "stenoforms," representing the different phonetic letters and characters, and which are adapted to be used in conjunction to form phonetic words similar to the manner in which the ordinary alphabetical blocks are used to spell words.

A further object is to provide the consonant and vowel phonoforms and such other phonoforms as may be deemed necessary with light and dark sides representing corresponding light and heavy strokes for the light and hard sounds, whereby the number of separate or independent phonoforms may be reduced without impairing the efficiency of the appliance and an appliance embodying a minimum number of parts insured, and also to provide an appliance which will serve to afford amusement and interest during the course of instruction.

With these and other objects in view my invention consists of an appliance of the character described combining certain novel features of construction and arrangement of parts, as will be hereinafter more fully described, and specifically set forth in the appended claims.

The invention is illustrated in the accompanying drawings, in which—

Figure 1 shows two views representing the obverse and reverse sides of a straight consonant bar or stem. Fig. 2 is a similar view showing the obverse and reverse sides of a curved or segment-shaped consonant-bar. Fig. 3 is a diagrammatic view showing in broken lines and on a smaller scale the consonant-bars arranged to represent different phonetic characters in accordance with the Pitmanic systems of phonography. Fig. 4 is a similar view of the curved bars. Fig. 5 represents the "iss" and "ses" or "sez" circles and illustrates the manner of employing the same in connection with a consonant. Fig. 6 represents two views of the "U" hook and illustrates two modes of using the same in connection with a consonant. Fig. 7 is a similar view of a hook and "iss" circle combined. Fig. 8 shows in plan views the obverse and reverse sides of a dot-vowel phonoform. Fig. 9 shows similar views of a dash-vowel phonoform. Figs. 10 and 11 are plan views of two diphthong-phonoforms. Fig. 12 is a plan view showing opposite sides of a straight-bar phonoform provided with an "ishon" circle and hook. Fig. 13 is also a plan view showing a "ster-loop" phonoform employed in connection with a straight-bar consonant. Fig. 14 is a similar view showing a "steh-loop" phonoform employed in connection with a straight-bar consonant. Fig. 15 is a bottom perspective view of the "steh-loop" phonoform. Fig. 16 is a plan view of a straight-bar phonoform having an integral hook. Fig. 17 illustrates the manner in which my phonoforms may be arranged to form a phonetic word.

In carrying out my invention I employ a series of movable patterns or forms, made of wood, fiber, papier-mâché, or some other suitable material, which are adapted to be used singly to represent phonetic letters or characters and in conjunction to form phonetic words. In the present instance I have shown in the accompanying drawings a sufficient number only of the phonoforms to illustrate the construction of the characters used in the well-known Pitmanic systems; but it is to be understood that the series may be amplified, as desired, to adapt it for general use or for specific use in instructing students in any of the modified systems of phonography or shorthand generally.

Referring now more particularly to the drawings, the numeral 1 represents a straight-bar consonant, which when placed in the different positions shown by broken lines in Fig. 2 denotes the recognized phonetic sounds "pe," "te," "chay," "kay," and "ray" or "be," "de," "jay," "gay," according to the side exposed, it being noted the obverse side 1ª of the bar is light, while the reverse side 1ᵇ thereof is dark. These sides may be colored by painting or otherwise and represent the light strokes made for light sounds and the heavier strokes for the deeper and harsher sounds. The curved or segment bar consonants 2 (shown in Fig. 2) are each also provided with a light obverse side 2ª and a dark reverse side 2ᵇ. These phonoforms when arranged in the position shown in Fig. 4 denote the recognized phonetic sounds "ith," "emp" or "emb," "ze" and "ing," or "es," "em" or "en," accordingly as the reverse or obverse sides thereof are exposed. They may also be arranged in different positions to denote the phonetic sounds of "lay," "ar," "ish," and "ef," "ev" and the duplicate forms of "rch" and "yay."

In Fig. 5 the "iss" and "ses" or "sez" circle phonoforms 3 and 4 are shown used in connection with the consonant-bar 1, (represented by broken lines.) These phonoforms may be provided with a flat edge to fit snugly against the side of the consonant-bar to produce a combination character well formed and without break or having the appearance of being formed by integral characters.

The "u-hook" phonoform 5 (shown in Fig. 6) may be employed in connection with the consonant-bar to represent an "iss" circle or an "ef" or "ve" hook. It may also be placed in different positions to represent "el," "ar," "ef," "ve," and "en," as occasion may warrant, and "weh," "wuh," &c., in double letters of the "way" and "yay" series.

Fig. 7 shows a combined hook and "iss-circle" phonoform 6 and illustrates one manner in which the same may be employed in connection with a straight-bar consonant. This obviates the necessity of employing two different characters to represent the hook and "iss" circle.

The dot-vowel phonoform shown in Fig. 8 is provided with a light obverse side 8ª and a dark reverse side 8ᵇ, while the dash-vowel phonoform (shown in Fig. 9) is similarly provided with a light obverse side 9ª and a dark reverse side 9ᵇ. These vowel-phonoforms are employed in the usual manner and placed in the three different positions to give vocalization.

The V and L shaped diphthongs 10 and 11 (shown in Figs. 10 and 11) are adapted to be used in different positions in connection with the consonant in the usual manner.

In Fig. 12 I have shown a straight-bar consonant provided with an integral "ishun" circle or hook phonoform. This phonoform may, however, be used independently, so as to adapt it for use in connection with either a straight-bar or a curved-bar phonoform.

In Figs. 13 and 14 I have shown, respectively, a "ster" loop and a "steh" loop used in connection with a straight-bar consonant, the numeral 14 representing the "ster" loop, numeral 15 the "steh" loop, with the numeral 16 the "iss-circle" terminal thereof. As loops of this character cross the bar, it is desirable to provide means for maintaining them in position to form a perfect phonetic character. To this end I provide each loop on its under side with a rest or supporting-block 17, having a shoulder 18, which bears against the side of the bar and holds the loop in proper position and prevents it from tilting down or over.

In Fig. 16 I have shown a straight-bar consonant 19 provided with an integral hook 5ª. This construction may be employed, if desired, although it is preferable to use the "u" hook, (shown in Fig. 6,) as this latter hook may be placed in different positions to represent a variety of sounds or characters.

The manner of using my phonoforms will be readily understood by reference to Fig. 17 of the drawings. In this figure I have shown two straight-bar consonants, a "u" hook, and an "iss" circle arranged to form the word "blocks." The phonoforms may be employed in connection with a ruled sheet of paper or a board, so that they may be placed in their proper positions relative to the line in vocalizing the different phonetic characters or words. In instructing large classes, however, it may be desirable to employ an easel or board on which the phonographs may be arranged and conveniently viewed by all the students. The surface of this board may be provided with a layer of cork or some other suitable soft material and each phonoform with a pin 20, as shown in Fig. 15, adapted to enter the said surface to support the phonoform thereon. This construction is not essential, however, as any other suitable means of supporting the phonoforms may be employed.

From the above description, taken in connection with the accompanying drawings, the construction and mode of operation of my invention will be readily understood, and it will be seen that it provides a simple and effective means whereby the kindergarten system of object-lesson instruction may be conveniently used in the study of phonography, or shorthand generally. It also provides effective means for instructing children, as interest and amusement is afforded at the same time that a knowledge of the art is being acquired by moving the phonoforms to their different positions and assembling them to form different phonetic words.

Having thus described my invention, what I claim as new, and desire to cover by Letters Patent, is—

1. In phonoforms or patterns for instructing beginners in phonography, the "ster" and "steh" loop patterns provided with the integral "iss" circle, substantially as described.

2. In phonoforms or patterns for instructing beginners in phonography, the "ster" and "steh" loop patterns provided with a rest or support on the under side thereof, substantially as described.

3. A set or series of movable patterns or forms for instructing beginners in the art of phonography, comprising straight and curved consonant-bars provided with obverse and reverse light and dark sides, combined with the "iss" and "ses" or "sez" circle patterns, the hook patterns, the vowel and diphthong patterns, and the "ster" and "steh" loop patterns designed to be used in connection with said consonant-bars.

4. In phonoforms or patterns for instructing beginners in the art of phonography, the combined hook and "iss-circle" patterns, substantially as described.

In testimony whereof I affix my signature in presence of two witnesses.

ARTHUR WM. THOMSON.

Witnesses:
  H. D. JAMESON,
  FRED. G. LUNNON.